United States Patent [19]

Spaulding

[11] 3,900,600

[45] Aug. 19, 1975

[54] PARAXYLYLENE-SILANE DIELECTRIC FILMS

[75] Inventor: Edward C. Spaulding, Poughkeepsie, N.Y.

[73] Assignee: International Business Machines Corporation, Armonk, N.Y.

[22] Filed: June 29, 1973

[21] Appl. No.: 375,294

[52] U.S. Cl. ...................... 427/99; 427/58; 427/78; 427/82; 427/117; 357/72; 264/81

[51] Int. Cl. ........................ B44d 1/18; C23c 11/00

[58] Field of Search ............ 117/106, 161 ZA, 201; 317/234 E

[56] References Cited

UNITED STATES PATENTS

| | | | |
|---|---|---|---|
| 3,342,754 | 9/1967 | Gorham | 117/106 R |
| 3,600,216 | 8/1971 | Stewart | 117/106 R |
| 3,713,886 | 1/1973 | Fulton | 117/106 R |
| 3,749,601 | 7/1973 | Tittle | 317/234 E |

OTHER PUBLICATIONS

Eisenmann, D. E., IBM Tech. Dis. Bull., Vol. 14, No. 8, pg. 2479, (1–1972).

*Primary Examiner*—Michael F. Esposito
*Attorney, Agent, or Firm*—David M. Bunnell; Daniel E. Igo

[57] ABSTRACT

Halogen substituted paraxylylene dimers admixed with bi-functional silanes and vapor deposited on a substrate or used as an encapsulant produce dielectric films having improved adherence, resistance to electromigration, and thermal stability.

8 Claims, No Drawings

PARAXYLYLENE-SILANE DIELECTRIC FILMS

BACKGROUND OF THE INVENTION

1. Field of the Invention

This invention relates to a method of producing dielectric or encapsulating films on substrates and particularly electronic device structures where reliable assurance against thermal and chemical deterioration is required. More specifically, this invention embraces the vapor deposition of admixtures of chloro substituted p-xylylene dimers and bi-functional silanes.

2. Description of the Prior Art

It is known that chlorinated derivatives of the cyclic dimer, di-p-xylylene are produced in accordance with well known methods, especially by reacting di-p-xylylene and carbon tetrachloride and chlorine in the presence of a suitable catalyst. These and similar compounds are capable of being polymerized to produce polymers suitable for use as dielectric materials, especially in electronic applications. Linear homopolymers of p-xylylenes are produced in nearly quantitative yield by heating a cyclo-di-p-xylylene having up to about 6 aromatic nuclear substituent groups to a temperature between about 450°C and 700°C for a time sufficient to cleave substantially all of the di-p-xylylene into vaporous p-xylylene diradicals but insufficient to further degrade the said diradicals and at a pressure such that the partial pressure of the vaporous p-xylylene diradicals is below 1.0 mm. Hg and preferably below 0.75 mm. Hg, and cooling the vaporous diradicals to a temperature below 200°C and below the ceiling condensation temperature of only one p-xylylene diradical specie present in the pyrolysis vapors. Condensation of this specific diradical yields the tough, linear, nonfluorescent homopolymers.

Organosilicon compounds and particularly compounds containing the aminoalkylsilyl grouping represented by the formula $NH_2\,(CH_2)_a\,Si \equiv$ where $a$ is an integer having a value of at least 3 and preferably 3 or 4 are prepared in accordance with well known methods for use as starting materials for the preparation of siloxane derivatives. The siloxane derivatives are used to make copolymeric material such as aminoalkylpolysiloxanes as starting compounds for manufacturing elastomeric organopolysiloxanes.

Although derivatives of the cyclic dimer, di-p-xylylene are known and used for the preparation of polymers for use as dielectric materials and silyl amines such as $\sigma$ amino-butyltriethoxysilane are used as starting materials for the preparation of siloxane derivatives of di-p-xylylene, the art has not taught the codeposition of a mixture the chlorinated derivative of p-xylylene and a bi-functional silane such as $\sigma$ aminobutyltriethoxysilane.

Electronic circuits in data processing systems are formed of extremely small active and passive circuit elements placed very close together in order to minimize signal coupling and translation times as well as the overall physical size of the unit. Particular technology directed to this end comprises fabrication of circuitry referred to as integrated circuitry wherein the various elements and conductive leads are formed by diffusing particular dopants of different types of conductivity into a layer of a semiconductor material such as silicon or germanium. Particular methods for forming transistors and other elements in this manner are described in the literature. It is, of course, practical to form certain elements such as capacitors and inductances according to standard printed circuit techniques and it is then necessary to form connections between the diffused elements and printed elements. With such methods, one may form a plurality of various logic circuits, oscillators and the like, as required in a data processing system. In order to provide a convenient means of assembling such circuits, the respective individual circuits are packaged in modular form for assembly of a plurality of such modules on circuit boards and the like.

While the technology of integrated circuitry is complex, production costs thereof can be minimized such that a major portion of such cost is related to the packaging of the circuitry. This is particularly true when hermetically sealed packages are employed to protect the surfaces of active elements from water vapor and other vapors to which such surfaces are electrically sensitive as well as to protect the circuit structure from corrosive vapors.

Furthermore, the components of integrated circuit technology are of extremely small size, of an order to tens of mils, and the electrical connections thereto are of much smaller dimensions which require extreme care in the handling and packaging. For example, standard epoxy coatings cannot be employed in packaging such elements since the epoxy contracts upon hardening thereby lifting the particular component away from its connection to the contact leads on the module.

In addition to the fragileness of the contacts between the components, integrated or otherwise, the respective circuits themselves must be protected from physical damage that will be inevitable in the handling of the components either during the replacement thereof in the field or during the manufacturing process. In order to isolate active surfaces of particular semiconductor elements or the entire integrated circuit itself, a layer of insulative material such as glass is placed over those surfaces which layer may be easily broken by almost any physical impact resulting in the shorting out of that component.

In addition to the requirements of an encapsulation that it protect the respective circuitry from exposure to corrosive atmospheres as well as protection against physical impact, the encapsulation system should be of such a nature as to provide flexibility in the accommodation of circuits of different sizes and complexities without requiring major changes in the production processes. To provide such flexibility as well as ease in assembly, one or more ceramic plates are provided in a stacked module configuration upon which plates the circuit elements or integrated circuit structures may be mounted with conductive support pins being provided through and between the respective plates for connection to the respective circuits. An inert non-stress conformal coating is placed over the circuitry on each of the respective plates to protect the respective circuitry from moisture and the like. A metal cover is adapted as to accommodate insertion of the module therein after which the cover is crimped to hold it in place with the assembly being secured with a rubber back seal. When it is desired to encapsulate a module consisting of circuits on more than one ceramic plate, only minor adjustments of the process and tooling need be made including an increase of the depth of the metal cover, as more specifically disclosed in U.S. Pat. No. 3,340,438 issued Sept. 5, 1967 to R. R. Dion, et al.

SUMMARY OF THE INVENTION

It is an object of this invention to provide a method for producing a dielectric film having improved thermal stability suitable for electronic applications.

It is a further object of this invention to provide improved encapsulation for electronic circuitry of the integrated structure type.

It is still a further object of this invention to provide a method for vapor depositing an organic film having improved substrate adherence.

It is another object of this invention to provide a method for depositing an organic film having improved resistance to electromigration.

Another object of this invention is to provide a method for vapor depositing upon a substrate an organic film having dielectric properties and which is uniform, thin, pinhole free and resistant to attack by common acids, bases and solvents.

The foregoing and other objects of this invention are accomplished by vapor depositing an admixture of para-xylylene dimers and bi-functional silanes. The admixture constituents are vaporized in separate chambers and admixed in a pyrolysis tube from which the mixture is fed into an evacuated deposition chamber having means for holding and supporting the substrates upon which the mixture is deposited from the vapor state upon the module, chip or substrate surface.

DESCRIPTION OF PREFERRED EMBODIMENTS

The halogen substituted dimers of paraxylylenes are represented by the structural formula

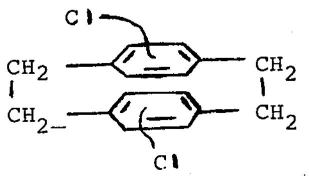

or in the case of more than one substituted halogen, the rings will have at least two substituted halogen atoms. It is to this type of substituted paraxylylene that a bi-functional silane or silanes are added in an admixture and codeposited upon a substrate. A specific class of silanes contemplated within the scope of this invention is silyl amines. The bi-functional silanes adaptable for use in this invention are represented by the formula $$H_2N(CH_2)_a\overset{R''_3}{\overset{|}{Si}}X(2-b)$$

where R'' represents an alkyl group such as methyl, ethyl, propyl and butyl, or the like, or an aryl group such as the phenyl, naphthyl and tolyl groups, or the like, and an aralkyl group such as benzyl group, or the like, X represents an alkoxy group, for example, methoxy, ethoxy, propoxy and the like, *a* is an integer having a value of at least 3 and preferably a value of from 3 to 4 and *b* is an integer having a value of from 0 to 2 and preferably a value of from 0 to 1. These compounds are illustrated by gamma-aminopropyl-triethoxysilane, gamma-aminopropylphenyl-diethoxysilane, delta-aminobutyltriethoxysilane, and the like. A single compound or mixtures of these silanes are mixed with halogen substituted paraxylylenes and vapor deposited upon a substrate to form a coating of desired thickness.

Any suitable apparatus for vapor deposition is adaptable for carrying out this invention usually a separate vapor chamber for the xylylene and silane constituents is provided wherein the compounds are preliminarily heated and passed into a pyrolysis tube for complete mixture and heating whereupon the admixture is directed via suitable manifold or other device into an evacuated deposition chamber wherein the vapor is deposited upon a substrate or a multiplicity of substrates to the desired thickness which is dependent upon process condition and the amount of admixed charge in case of a batch operation or flow conditions where a continuous operation is contemplated.

The amount of admixture elements is dependent upon the nature of the film desired and the process conditions under which deposition takes place. A ratio of one part by weight of xylylene to one part by weight of silane or silanes was found operable. Similarly, a vapor deposition under vacuum was found best carried out at a temperature not in excess of 45°C.

The following specific examples are illustrative of particular embodiments of the invention whereby films having improved electrical migration properties were obtained as well as films exhibiting superior thermal stability. These examples are intended for illustrative purposes only and in no way are to be construed as limiting the invention.

Electrical migration properties was determined by coating a sample substrate having a conductive metal such as copper or silver thereon and having a gap of from 1 to 4 mils in said conductive path upon which is placed a power of from 20–300 DC volts and the time for electrical bridging of the gap observed. In the case of electronic modules and devices, this observation is usually observed under a microscope.

Thermal degradation tests were run in accordance with standard procedure and apparatus well known in the art and recognized as Thermal Gravametric Analysis (TGA) and Differential Thermal Analysis (DTA).

EXAMPLE I

A mixture of 10 grams of chlorine mono substituted para-xylylene and 2.5 grams of $\beta$ (3,4 - epoxycyclohexyl)-ethyltrimethoxysilane and 2.5 grams g-aminopropyltriethoxysilane was vaporized at a temperature between 185°C–205°C and deposited upon an electronic device substrate to a thickness of .2 mil under a vacuum of approximately 42–62 microns of mercury and a temperature of 40°C. The film thus produced exhibited thermal degradation per DTA at 296°C and wet electromigration tests across a 1.5–2 mil gap of silver palladium metallurgy exhibited negative migration after 19 hours at 100 V dc.

EXAMPLE II

A mixture of 10 grams of mono chlorine substituted para-xylylene and 4 grams of $\beta$ (3,4 - epoxycyclohexyl)-ethyltrimethoxysilane were vaporized at a temperature of between 190°C–210°C and vapor deposited in accordance with the procedure set forth in Example I. Thermal degradation developed at 288°C and electrical migration appeared after 2½ hours.

EXAMPLE III

A mixture of 10 grams of chlorine disubstituted paraxylylene and 2 grams of g-aminopropyltriethoxysilane and 2 grams of $\beta$ (3,4 - epoxycyclohexyl)-ethyltrimethoxysilane were vaporized at a temperature between 190°C–210°C and vapor deposited upon a substrate as illustrated in Example I to a film thickness of .2 mil. Thermal degradation occurred at 299°C and wet electrical migration did not develop even after more than 1,000 hours.

EXAMPLE IV

A mixture of 13 grams of chlorine disubstituted paraxylylene and 4 grams of N-$\beta$ (aminoethyl) gamma-aminopropyltrimethoxysilane was vaporized at a temperature between 190°C–210°C and vapor deposited in accordance with the procedure outlined in Example I. Thermal degradation began at 348°C and electrical migration began at about 70 hours.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. A method for producing dielectric films comprising admixing halogen substituted paraxylylene dimers and silyl amines in a ratio of 1:1 to 5:1 by weight of dimer to amine, heating the admixture to vaporize the admixture and vapor depositing said admixture upon a substrate under reduced pressure.

2. A method in accordance with claim 1 wherein said halogen substituted paraxylylene dimer is mono chlorine substituted paraxylylene.

3. A method in accordance with claim 1 wherein said halogen substituted paraxylylene dimer is a di chlorine substituted paraxylylene.

4. A method in accordance with claim 1 wherein said silyl amine is a single compound.

5. A method in accordance with claim 1 wherein said silyl amine admixture is at least two silyl amine compounds.

6. A method in accordance with claim 1 wherein said substrate in an electronic module.

7. A method in accordance with claim 1 wherein said silyl amine is g-aminopropyltriethoxysilane.

8. A method in accordance with claim 1 wherein said silyl amine is N-$\beta$ (aminoethyl) gamma-aminopropyltrimethoxysilane.

* * * * *